US010655882B2

(12) United States Patent
Matsumoto et al.

(10) Patent No.: US 10,655,882 B2
(45) Date of Patent: May 19, 2020

(54) REMOTE MANAGEMENT SYSTEM (71) Applicant: DAIKIN INDUSTRIES, LTD., Osaka-shi, Osaka (JP)

(72) Inventors: Erika Matsumoto, Osaka (JP); Hidehiko Hashimoto, Osaka (JP); Gou Nakatsuka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/079,510

(22) PCT Filed: Feb. 23, 2017

(86) PCT No.: PCT/JP2017/006937
§ 371 (c)(1),
(2) Date: Aug. 23, 2018

(87) PCT Pub. No.: WO2017/146176
PCT Pub. Date: Aug. 31, 2017

(65) Prior Publication Data
US 2019/0049138 A1 Feb. 14, 2019

(30) Foreign Application Priority Data
Feb. 26, 2016 (JP) ................................ 2016-036150

(51) Int. Cl.
*F24F 11/58* (2018.01)
*F24F 11/89* (2018.01)
(Continued)

(52) U.S. Cl.
CPC .............. *F24F 11/58* (2018.01); *F24F 11/32* (2018.01); *F24F 11/49* (2018.01); *F24F 11/89* (2018.01);
(Continued)

(58) Field of Classification Search
CPC .. F24F 11/32; F24F 11/49; F24F 11/58; F24F 11/89; G08C 17/00; G08C 2201/42;
(Continued)

(56) References Cited

U.S. PATENT DOCUMENTS

2010/0127881 A1* 5/2010 Schechter .......... H05K 7/20836
340/584
2014/0031992 A1* 1/2014 Bergman ................. F24F 11/00
700/276
(Continued)

FOREIGN PATENT DOCUMENTS

| JP | 2005-65164 A | 3/2005 |
|---|---|---|
| JP | 2005-84731 A | 3/2005 |
| WO | 2014/175433 A1 | 10/2014 |

OTHER PUBLICATIONS

International Search Report of corresponding PCT Application No. PCT/JP2017/006937 dated May 23, 2017.
(Continued)

Primary Examiner — Yuhui R Pan
(74) Attorney, Agent, or Firm — Global IP Counselors, LLP (57) ABSTRACT A remote management system includes an air conditioner, an information mediation device built in or connected to the air conditioner, an information management apparatus that acquires air conditioner information including items relating to the air conditioner via the information mediation device and a network, and a plurality of participant terminals. The terminals include one or more of a manager terminal, a manufacturer terminal, a seller terminal, a maintenance worker terminal, and a user terminal. The information mediation device transmits the air conditioner information to the information management apparatus at a certain transmission frequency. The information mediation device is able to change, according to a participant request input by each
(Continued)

of the plurality of participant terminals, the items included in the air conditioner information to be transmitted or a transmission frequency relating to the transmission, or both.

20 Claims, 7 Drawing Sheets (51) Int. Cl.
*H04Q 9/00* (2006.01)
*H04L 12/28* (2006.01)
*G08C 17/00* (2006.01)
*F24F 11/32* (2018.01)
*F24F 11/49* (2018.01)

(52) U.S. Cl.
CPC .......... *G08C 17/00* (2013.01); *H04L 12/2803* (2013.01); *H04Q 9/00* (2013.01); *G08C 2201/42* (2013.01); *G08C 2201/51* (2013.01); *H04Q 2209/826* (2013.01)

(58) Field of Classification Search
CPC ............ G08C 2201/51; H04L 12/2803; H04Q 2209/826; H04Q 9/00
See application file for complete search history.

(56) References Cited

U.S. PATENT DOCUMENTS

| 2014/0096126 A1* | 4/2014 | Gourlay | ................. G05B 15/02 717/173 |
| 2016/0182704 A1* | 6/2016 | Minezawa | .......... H04L 12/2818 455/420 |
| 2017/0244575 A1* | 8/2017 | Yamane | .................. G06F 13/00 |

OTHER PUBLICATIONS

International Preliminary Report of corresponding PCT Application No. PCT/JP2017/006937 dated Sep. 7, 2018.
European Search Report of corresponding EP Application No. 17 75 6614.8 dated Jan. 3, 2019.

* cited by examiner

REMOTE MANAGEMENT SYSTEM

CROSS-REFERENCE TO RELATED APPLICATIONS

This U.S. National stage application claims priority under 35 U.S.C. § 119(a) to Japanese Patent Application No. 2016-036150, filed in Japan on Feb. 26, 2016, the entire contents of which are hereby incorporated herein by reference.

TECHNICAL FIELD

The present invention relate to a remote management system.

BACKGROUND ART

An air conditioner that performs air conditioning of a building usually includes a plurality of indoor units of which at least one is installed on each floor, and one or a plurality of outdoor units. A remote management system in charge of a predetermined jurisdictional area may be installed in order to manage such air conditioners. The remote management system centrally monitors the states of different air conditioners installed in different buildings in the jurisdictional area and issues commands for operating the air conditioners.

Multiple participants are involved in the monitoring and operation of an air conditioner. That is, in addition to the manager who operates the remote management system and the owner and the users of the air conditioner, maintenance workers, manufacturers and sellers of the air conditioner can also be involved. For example, in the remote management system disclosed in Japanese Unexamined Patent Application No. 2005-84731, participants such as a central manager ("access management center"), the building owner ("building management apparatus"), user ("equipment operating terminal") are involved in the management of devices such as an air conditioner. The terminals used by such various participants are given different authorities related to monitoring and operation of the air conditioner.

SUMMARY

The participants need to communicate with the air conditioner under different circumferences. Accordingly, the desired frequency of communication varies depending on the circumferences. Likewise, the content and frequency of operations of the air conditioner required by each participant also differ. Under such conditions, acquiring the operating state of the air conditioner and/or communicating with the participant terminals at a similar frequency in response to requests from all participants could lead to an excessive waste of system resources such as arithmetic processing ability and data communication capability.

The object of the present invention is to efficiently utilize system resources in a remote management system.

A remote management system according to a first aspect of the present invention is provided with an air conditioner, an information mediation device, an information management apparatus, and a plurality of participant terminals. The information mediation device is built in or connected to the air conditioner. The information management apparatus acquires air conditioner information via the information mediation device and a network. The air conditioner information includes items relating to the air conditioner. The plurality of participant terminals includes at least one of a manager terminal used by a manager, a manufacturer terminal used by a manufacturer, a seller terminal used by a seller, a maintenance worker terminal used by a maintenance worker, and a user terminal used by a user. The information mediation device is constituted so as to transmit the air conditioner information to the information management apparatus at a certain transmission frequency. The information mediation device is further able to change the items included in the air conditioner information to be transmitted and/or a transmission frequency relating to the transmission, according to a participant's request input by each of the plurality of participant terminals.

According to this constitution, the frequency or content of communication of the information mediation device may be changed according to a request from at least any of the manager, manufacturer, seller, maintenance worker, and user. Accordingly, excessive waste of system resources for the preparation of data of items to be communicated and for communication of the data is reduced.

A remote management system according to a second aspect of the present invention is the remote management system according to the first aspect, in which the information management apparatus is constituted so as to be able to change a function of the information mediation device according to a content of a signal from the participant terminal.

According to this constitution, the function of the information mediation device can be changed according to a request of each participant. Accordingly, system resources can be optimized corresponding to the needs of participants.

A remote management system according to a third aspect of the present invention is the remote management system according to the second aspect, in which the information mediation device has a program storage unit in which a program for operating the information mediation device is stored. The information management apparatus modifies the program in order to change the function of the information mediation device.

According to this constitution, the program of the information mediation device can be modified in accordance with the request of each participant. Accordingly, system resources can be blither optimized beyond the level of simple parameter changes.

A remote management system according to a fourth aspect of the present invention is the remote management system according to the second aspect or the third aspect, in which the information management apparatus uses the participant terminals to form (construct) an air conditioner management device or means.

According to this constitution, the air conditioner management device (means) is constructed in each of the participant terminals. Accordingly, each participant can manage the air conditioner via the air conditioner management device (means).

A remote management system according to a fifth aspect of the present invention is the remote management system according to any one of the first aspect to the fourth aspect, in which the information management apparatus is able to operate the air conditioner.

According to this constitution, the information management apparatus is able to operate the air conditioner. Therefore, the air conditioner is remotely operated.

A remote management system according to a sixth aspect of the present invention is the remote management system according to any one of the second aspect to the fifth aspect, in which the participant terminals include the maintenance worker terminal. The information management apparatus further displays maintenance information in the maintenance worker terminal in the event of failure of the air conditioner.

According to this constitution, maintenance information is displayed in the maintenance worker terminal. Accordingly, the maintenance worker can acquire information necessary for maintenance work, for example, in the event of failure of the air conditioner.

A remote management system according to a seventh aspect of the present invention is the remote management system according to any one of the second aspect to the sixth aspect, in which each of the participant terminals can acquire items of the air conditioner information from the information management apparatus in accordance with the authority set to that participant terminal, and can perform operation of the air conditioner in accordance with the authority of that participant terminal via the information management apparatus.

According to this constitution, each of the participants can manage the air conditioner according to the authority of that participant. Accordingly, each participant can operate the air conditioner so as to meet a request within the range of the authority allowed to that participant.

A remote management system according to an eighth aspect of the present invention is the remote management system according to any one of the first aspect to the seventh aspect, in which each of the plurality of participant terminals and the information management apparatus are constituted so as to perform communication at a predetermined communication frequency. In the communication, the information management apparatus is constituted so as to transmit at least a part of the air conditioner information received from the information mediation device, to the participant terminal.

According to this constitution, each participant terminal periodically receives air conditioner information. Accordingly, each participant can receive new air conditioner information at appropriate time intervals.

Advantageous Effects of Invention

According to the remote management system of the first aspect of the present invention, excessive waste of system resources is reduced.

According to the remote management system of the second aspect of the present invention, system resources can be optimized corresponding to the needs of each participant.

According to the remote management system of the third aspect of the present invention, system resources can be further optimized beyond the level of simple parameter changes.

According to the remote management system of the fourth aspect of the present invention, each participant can manage the air conditioner via the air conditioner management device (means).

According to the remote management system of the fifth aspect of the present invention, the air conditioner is remotely operated.

According to the remote management system of the sixth aspect of the present invention, the maintenance worker can acquire information necessary for maintenance work, for example, in the event of failure of the air conditioner.

According to the remote management system of the seventh aspect of the present invention, each participant can operate the air conditioner so as to meet a request within the range of authority allowed to that participant.

According to the remote management system of the eighth aspect of the present invention, each participant can receive new air conditioner information at appropriate time intervals.

DESCRIPTION OF EMBODIMENTS

Hereinbelow, the embodiment of the air conditioning apparatus according to the present invention is explained with reference to the drawings.

(1) Overall Constitution

Figure 1:
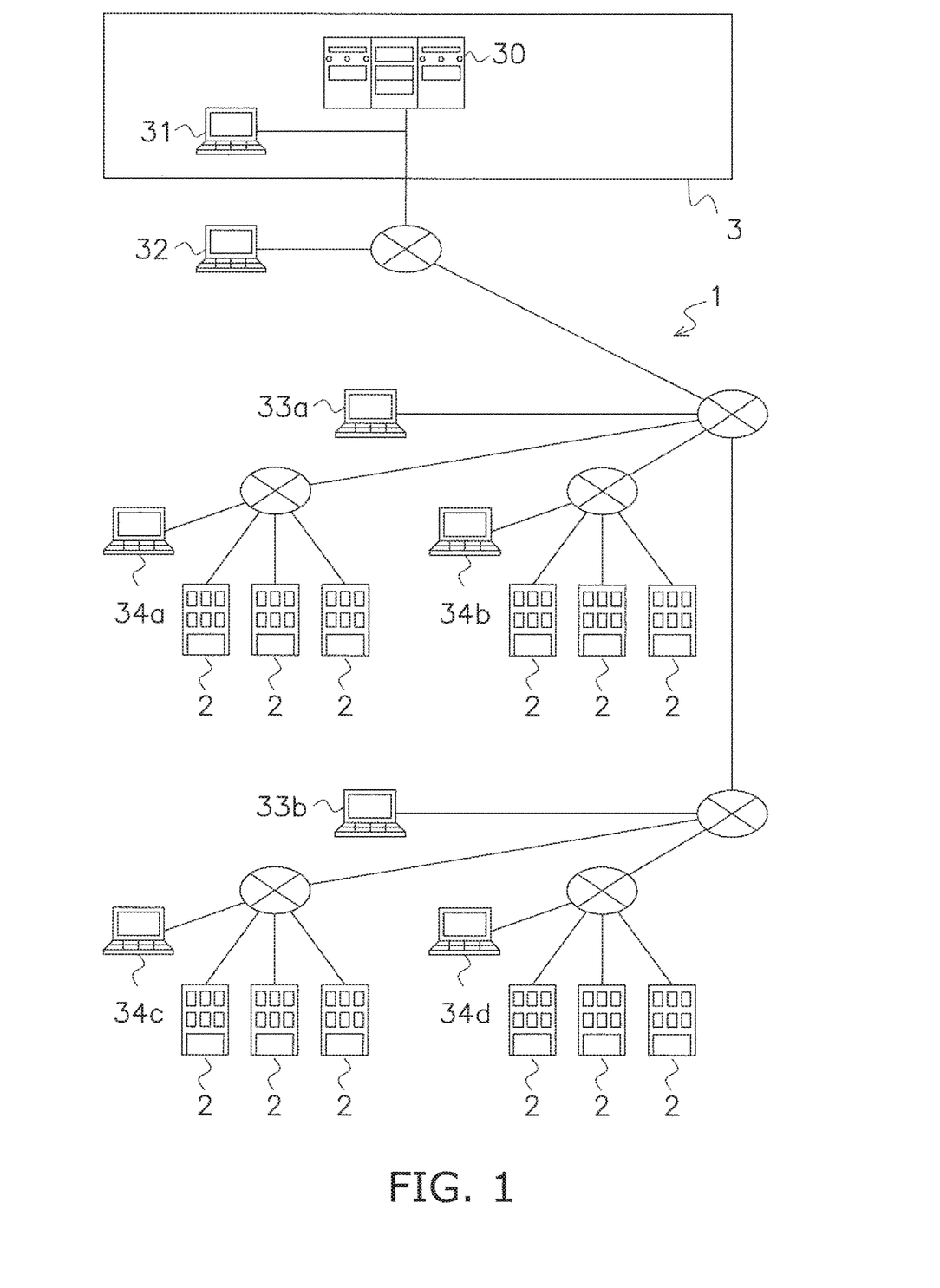
FIG. 1 is a schematic drawing of a remote management system 1 according to the present invention.

FIG. 1 is a schematic drawing of the remote management system 1 according to one embodiment of the present invention. The remote management system 1 has one central management center 3. Many buildings 2 exist in the jurisdictional area of the central management center 3. The remote management system 1 has a manufacturer terminal 32 used by the manufacturer of an air conditioner, seller terminals 33a and 33b used by sellers who are in charge of parts of the jurisdictional area, and maintenance worker terminals 34a, 34b, 34c, and 34d used by maintenance workers who are in charge of subdivided sections of the jurisdictional area.

(2) Detailed Constitution

Figure 2:
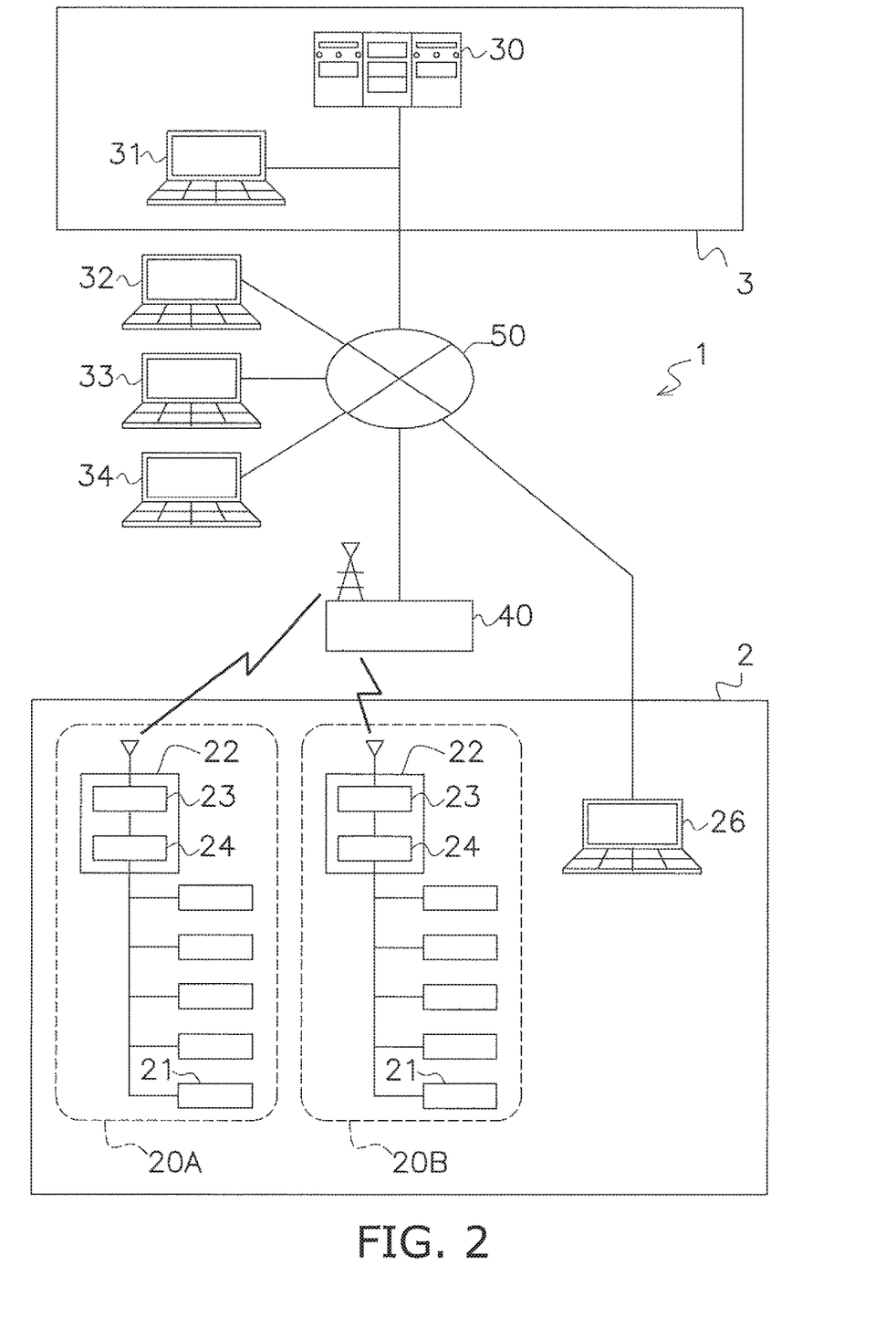
FIG. 2 is a schematic drawing that shows the constitution of the remote management system 1, focusing on one building 2.

FIG. 2 is a drawing that shows the constitution of the remote management system 1, focusing on one of the many buildings 2 shown in FIG. 1. The one building 2 shown here is overseen by one manufacturer terminal 32, one seller terminal 33, and one maintenance worker terminal 34. These terminals, along with the building 2 and the central management center 3, are connected to a network 50 such as the Internet.

(2-1) Building 2

The building 2 is for example a commercial building or a condominium, in which air conditioners 20A and 20B of two systems and a user terminal 26 are installed.

(2-1-1) Air Conditioners 20A and 20B

The air conditioner 20A and the air conditioner 20B of two systems have similar constitutions. Hereinbelow, the air conditioner 20A will be described in this section (2-1-1), with a description of the air conditioner 20B being omitted.

The air conditioner 20A has one outdoor unit 22 and a plurality of indoor units 21. The outdoor unit 22 is for example installed on the outside of the building 2, such as on the roof. The plurality of indoor units 21 are installed in a distributed manner on the floors or in the rooms of the building 2. The outdoor unit 22 and the indoor units 21 are connected by refrigerant piping not illustrated, and thereby form a refrigerant circuit. In each of the rooms in which the indoor unit 21 is installed, an operation panel (not illustrated) is installed for the room occupant to change the content of the air conditioning operation.

The outdoor unit 22 is a device that functions as a heat source in the refrigerant circuit. A wireless communication device 23 and an information mediation device 24 are built in the outdoor unit 22. The wireless communication device 23 can connect to a mobile broadband line by carrying out wireless communication with a communication base station 40 owned by a telecommunications service operator. The information mediation device 24 is connected to the wireless communication device 23. Thereby, the information mediation device 24 can perform the transfer of various commands and various data with the wireless communication device 23. Moreover, the information mediation device 24 is connected to a control circuit of the air conditioner 20A to which the information mediation device 24 itself belongs. Thereby, the information mediation device 24 can perform control of operating the outdoor unit 22 and the plurality of indoor units 21, and can acquire air conditioner information from the outdoor unit 22 and the plurality of indoor units 21. This air conditioner information includes for example control information on motor-operated valves, motors and other actuators belonging to the air conditioner 20A, output signals from sensors belonging to the air conditioner 20A, abnormality warnings of the air conditioner 20A, and a completion report of an operation instructed by a command, and the like.

Figure 3:
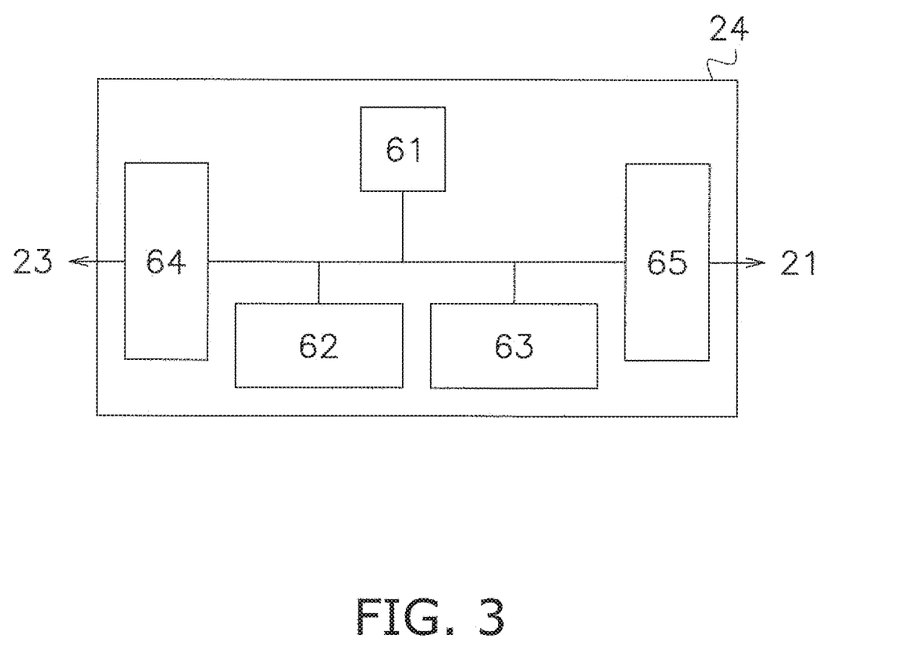
FIG. 3 is a block drawing of an information mediation device 24.

As shown in FIG. 3, the information mediation device 24 has a central processing unit 61, a program storage unit 62, a data storage unit 63, a wireless communication device interface 64, and an air conditioner interface 65. The central processing unit 61 performs all arithmetic processing handled by the information mediation device 24. The program storage unit 62 is a part for storing a program executed by the central processing unit 61, and is composed of, for example, nonvolatile memory. The data storage unit 63 is a part for temporarily storing data and the like generated in the course of the arithmetic processing, and is composed of, for example, volatile memory. The wireless communication device interface 64 converts protocols so as to enable communication between the information mediation device 24 and the wireless communication device 23. The air conditioner interface 65 converts protocols so as to enable communication between the information mediation device 24 and the control circuit mounted in the air conditioner 20A.

(2-1-2) User Terminal 26

Returning to FIG. 2, the user terminal 26 is a terminal used by the owner of the building 2. The user terminal 26 can communicate with the central management center 3 via the network 50. Using the user terminal 26, the owner of the building 2 can inform the central management center 3 of a request regarding operation of the air conditioners 20A and 20B installed in the building 2 belonging to the owner. For example, the owner can request the central management center 3 to set an upper limit in the variable range of the set temperature of the air conditioners 20A and 20B.

(2-2) Central Management Center 3

The central management center 3 is a facility for managing the air conditioners 20A and 20B installed in the building 2 in the jurisdictional area, and is provided with an information management apparatus 30 and a manager terminal 31.

The information management apparatus 30 has a large-capacity storage device, and can accumulate data and operation histories transmitted by the many air conditioners 20A and 20B in the jurisdictional area. The information management apparatus 30 moreover can transmit various commands to the many air conditioners 20A and 20B the jurisdictional area.

The manager terminal 31 is a terminal used by the manager for managing the many air conditioners 20A and 20B in the jurisdictional area. The manager terminal 31 can monitor information transmitted from the air conditioners 20A and 20B in cooperation with the information management apparatus 30. Furthermore, the manager terminal 31 can request the information management apparatus 30 to transmit a command for causing the air conditioners 20A and 20B to perform a desired operation. This command transmission request is issued based on an input of the manager operating the manager terminal 31 or the like.

(2-3) Manufacturer Terminal 32

The manufacturer terminal 32 is a terminal used by the manufacturer of the air conditioners 20A and 20B. The manufacturer can verify the design of the air conditioners 20A and 20B by acquiring the air conditioner information transmitted from the air conditioners 20A and 20B with the manufacturer terminal 32. When necessary, the manufacturer can also request the information management apparatus 30 to restrict the operation of the air conditioners 20A and 20B with the manufacturer terminal 32.

(2-4) Seller Terminal 33

The seller terminal 33 is a terminal used by the seller of the air conditioners 20A, 20B. The seller can ascertain, for example, the replacement timing of the consumable members of the air conditioners 20A, 20B by acquiring the air conditioner information transmitted from the air conditioners 20A, 20B with the seller terminal 33. The information that the seller can view with the seller terminal 33 may be limited to only those air conditioners 20A, 20B that the seller was involved in selling.

(2-5) Maintenance Worker Terminal 34

The maintenance worker terminal 34 is a terminal used by the seller of the air conditioners 20A, 20B. The maintenance worker can find out the content of the maintenance work to be performed by acquiring the air conditioner information transmitted from the air conditioners 20A, 20B with the maintenance worker terminal 34. Moreover, using the maintenance worker terminal 34, the maintenance worker can issue a request regarding the operation to be performed by the air conditioners 20A and 20B that are the targets of the maintenance work, to the information management apparatus 30.

(3) Basic Operation

The operation of the remote management system 1 will now be described with reference to FIG. 2. Here, the term "participant terminal" is used to generically refer to the user terminal 26, the manager terminal 31, the manufacturer terminal 32, the seller terminal 33, and the maintenance worker terminal 34, which are terminals participating in the management of the air conditioners 20A, 20B.

Each of the participant terminals can participate in management of the air conditioners 20A, 20B. Here, "management" includes both "monitoring", which entails receiving and displaying data of air conditioner information transmitted from the air conditioners 20A, 20B, and "operating", which entails transmitting commands to the air conditioners 20A, 20B to execute desired operations. The content of the management that each of the participant terminals can perform is restricted based on the authority given to that participant, with the restricted content of the management being incorporated in the hardware or software of at least one of the participant terminals and the information management apparatus 30.

When a participant wants the air conditioners 20A, 20B to execute some operation, the participant inputs the content of that operation into the participant terminal, whereby a "participant request" corresponding to that operation is transmitted to the information management apparatus 30. Alternatively, irrespective of the intention of the participant, there may also be cases in which the participant terminal autonomously transmits a participant request to the information management apparatus 30. The participant request autonomously issued by participant terminals is made for the purpose of "monitoring," for example. That is, an example of an autonomous participant request is a request to periodically have the information management apparatus 30 operate the air conditioner 20A, 20B so as to transmit current temperature data detected by the indoor unit 21 to the participant terminals.

The information management apparatus 30 can arbitrate a plurality of participant requests. That is, the information management apparatus 30 scrutinizes contents of the participant requests received from all the participant terminals, considers the authority of each participant terminal and the priority of the participant requests, and thereby determines the contents of the commands to be transmitted to air conditioners 20A, 20B. This arbitration may also be performed in consideration of the operation content of the operation panel for the occupant, besides the content of the plurality of participant requests.

Any outdoor unit 22 of the air conditioners 20A, 20B also transmits a request for notification of the presence or absence of a command and the like, to the information management apparatus 30 at a predetermined transmission frequency, for example once per minute, by the function of the information mediation device 24 present in that outdoor unit 22. This request operation is executed by the central processing unit 61 on the basis of a program stored in the program storage unit 62 (FIG. 3) of the information mediation device 24. The information management apparatus 30 transmits the presence or absence of a command and the content of the command if any, to the information mediation device 24 that issued the request.

In accordance with the received command, the information mediation device 24 directly or indirectly controls the motor-operated valve, the compressor motor, the fan motor, and other actuators mounted in the outdoor unit 22 or the indoor unit 21, and then transmits to the information management apparatus 30 a completion report of the operation indicated by the command. Alternatively, in accordance with the received command, the information mediation device 24 transmits output signal data of sensors mounted in the outdoor unit 22 or the indoor unit 21 and a completion report of the operation to the information management apparatus 30.

(4) Detailed Operation
(4-1) Operation Screen

Figure 4:
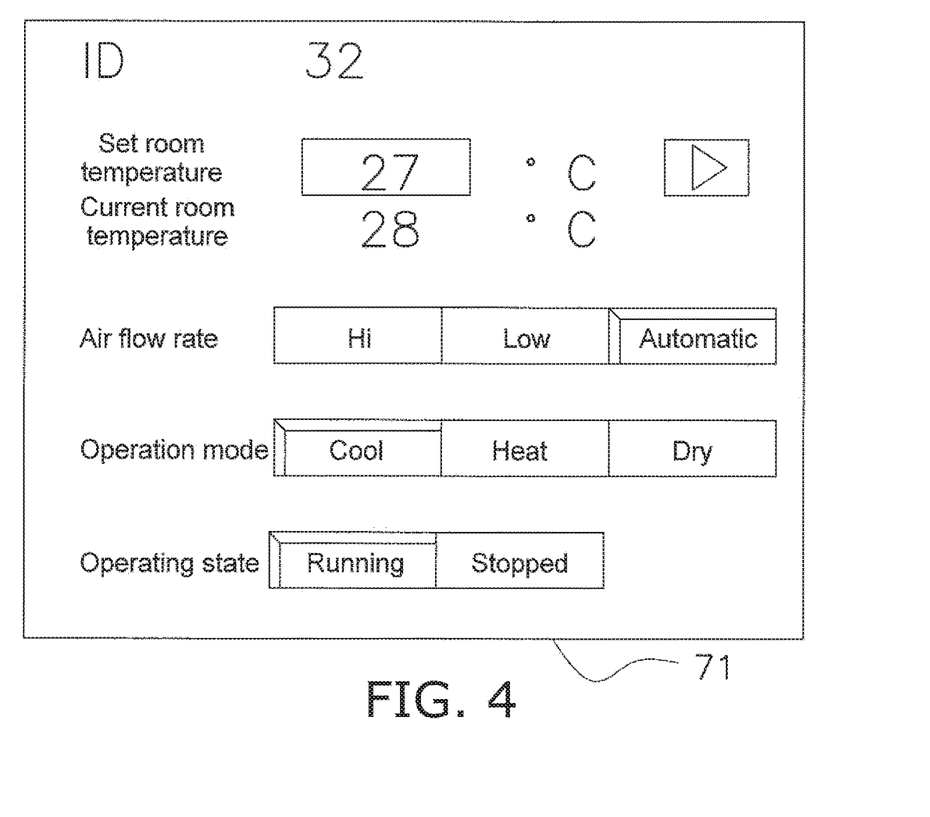
FIG. 4 shows an example of a screen of a user terminal 26.

FIG. 4 shows an example of a screen 71 of the user terminal 26. This screen 71 is displayed to the owner of the building 2. Using this screen 71, the building owner can know the current room temperature acquired by a specific one among the plurality of indoor units 21 installed in the building 2. Moreover, the building owner can use this screen 71 to input requests regarding air flow rate, operation mode, and operating state to the user terminal 26.

Figure 5:
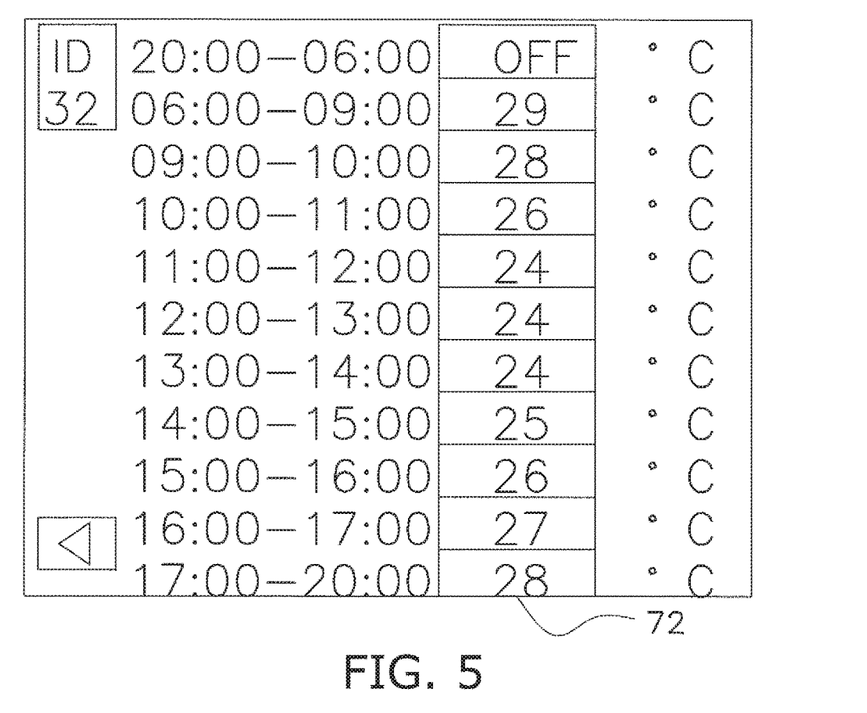
FIG. 5 shows another example of a screen of the user terminal 26.

FIG. 5 shows another screen 72 of the user terminal 26. Using this screen 72, the building owner can input requests regarding the schedule for the transition of set temperatures through the day to the user terminal 26.

Figure 6:
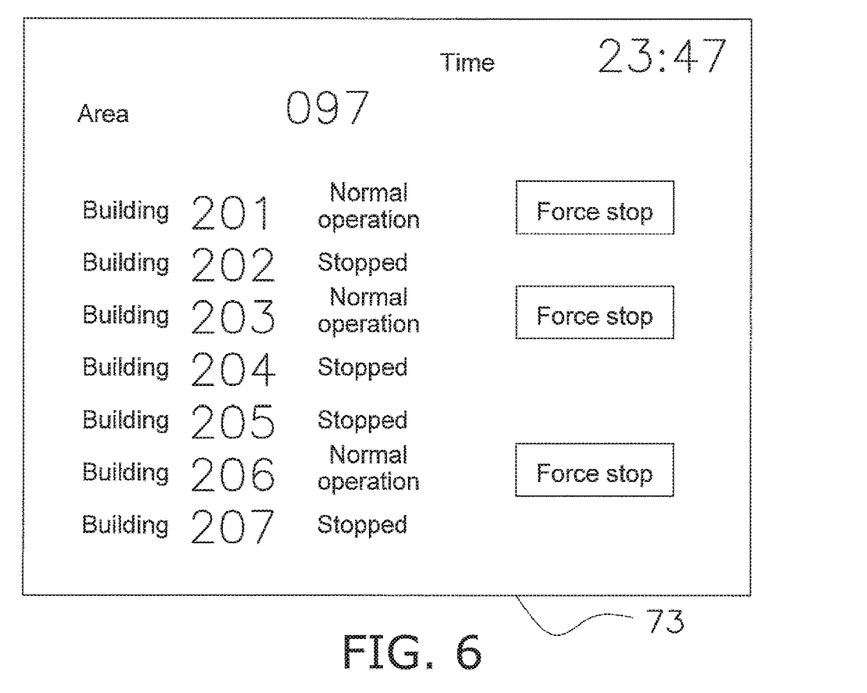
FIG. 6 shows an example of a screen of a manager terminal 31.

FIG. 6 shows an example of a screen 73 of the manager terminal 31. This screen 73 is shown to the manager engaged in management on the air conditioners 20A, 20B in the central management center 3. Using, this screen 73, the manager can know whether or not air conditioners 20A, 20B installed in the plurality of buildings 2 in a specified region are operating or stopped. In addition, using this screen 73 the manager can know whether the operation of those air conditioners 20A, 20B is normal or abnormal. Moreover, using this screen 73, the manager can input a request to forcibly stop the air conditioners 20A, 20B in operation that are installed in a specific building 2, to the manager terminal 31.

Figure 7:
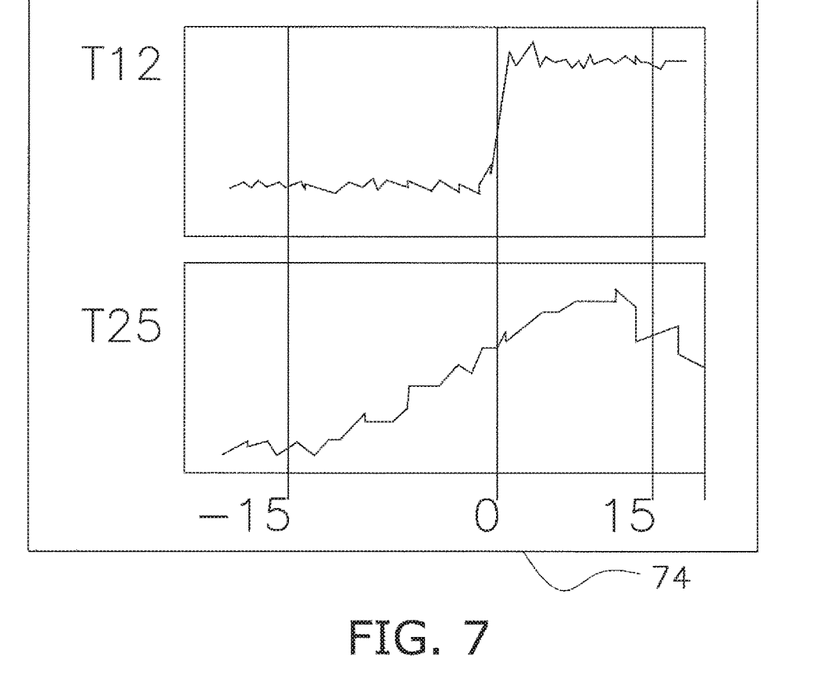
FIG. 7 shows an example of a screen of a maintenance worker terminal 34.

FIG. 7 shows an example of a screen 74 of the maintenance worker terminal 34. This screen 74 is displayed for the maintenance worker who is in charge of maintenance work on the air conditioners 20A, 20B installed in a predetermined area of responsibility. Via the maintenance worker terminal 34, the maintenance worker can input a request of the air conditioners 20A, 20B that have issued an abnormality warning to transmit operation history data around the time of failure stored in the circuit board of the outdoor unit 22. This screen 74 presents the operation history data around the time of the failure acquired from the outdoor unit 22, to the maintenance worker. On the basis of maintenance information such as this operation history data, the maintenance worker can perform maintenance work on the air conditioners 20A, 20B in which failure is suspected.

These screens 71 to 74 are constructed by the respective participant terminals as, for example, web forms in a display format similar to that of browsers displaying websites on a PC monitor. By the participant operating various controls that appear in the screens 71 to 74 (that is, push buttons, check boxes, radio buttons, text input, and the like), the participant terminal emits signals corresponding to those operations. The information management apparatus 30 receives the signals, and transmits various commands to the information mediation device 24 in accordance with those signals.

(4-2) Change of Transmission Frequency

Figure 8:
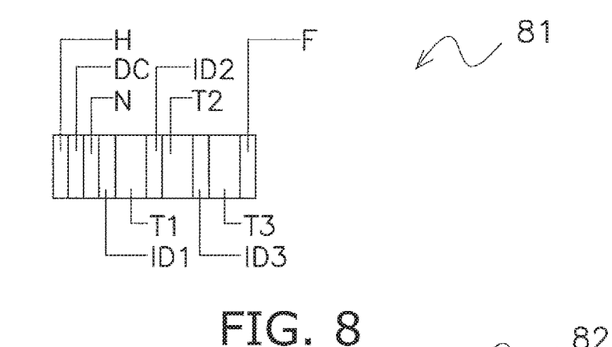
FIG. 8 shows an example of data sent to the user terminal 26.

FIG. 8 shows an example of data 81 transmitted by the information mediation device 24 to the user terminal 26. The air conditioner information included in this data 81 is one item of the current room temperature data acquired by the temperature sensor of the indoor unit 21.

The data 81 starts from the header H, which is followed by the data code DC and the number N of indoor units 21. Here, the number N of units is three. Then, the number is followed by the identification number ID1 of the first indoor unit 21 and the current room temperature T1, the identification number ID2 of the second indoor unit 21 and the current room temperature T2, and the identification number ID3 of the third indoor unit 21 and the current room temperature T3. The data 81 ends with footer F.

Figure 9:
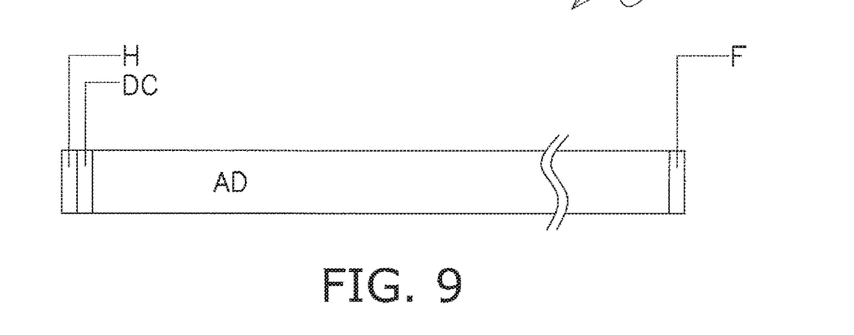
FIG. 9 shows an example of data sent to the maintenance worker terminal 34.

FIG. 9 shows an example of data 82 transmitted from the information mediation device 24 to the maintenance worker terminal 34. The air conditioner information included in this data 82 is one item of the operation history data around the time of the failure acquired from sensors belonging to the air conditioners 20A, 20B in which the failure is suspected.

The data 82 includes a header H, a data code DC, operation history data AD, and a footer F. Since the size of the operation history data AD is extremely large, the size of the data 82 is much larger than the size of the data 81. Therefore, the time required for the information mediation device 24 to transmit the data 82 to the maintenance worker terminal 34 is longer than the time required for transmitting the data 81. As described in section (3) "Basic operation", the information mediation device 24 communicates with the information management apparatus 30 at a predetermined transmission frequency such as once a minute or the like according to the program stored in the program storage unit 62. Accordingly, when the size of the data 82 is too large, conflict occurs between the transmission process of the data 82 and the periodic communication process based on the transmission frequency of the information mediation device 24. Therefore, when the maintenance worker terminal 34 issues a request for transmission of the data 82 by the information mediation device 24, the maintenance worker terminal 34 autonomously issues a request for lowering the transmission frequency of the information mediation device 24, along with the request for transmission, to the information management apparatus 30.

Figure 10:
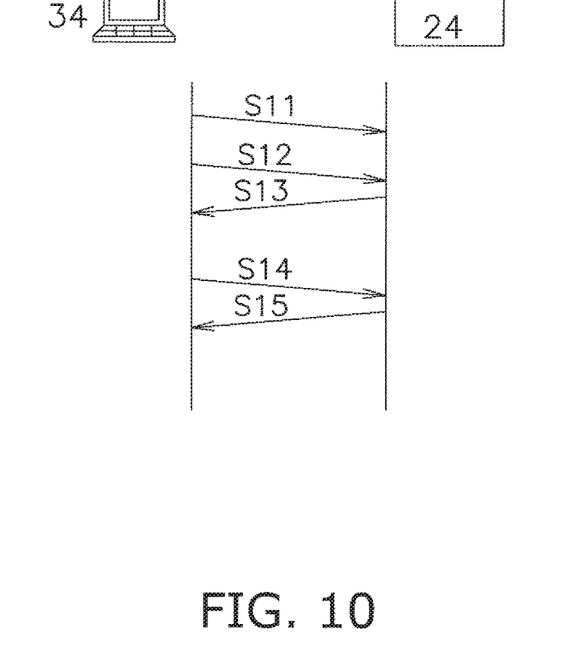
FIG. 10 is a drawing that shows the communication protocol between the maintenance worker terminal 34 and the information mediation device 24.

FIG. 10 is an outline drawing of the communication protocol between the maintenance worker terminal 34 and the information mediation device 24. In this drawing, the way of interposition of the information management apparatus 30 for arbitrating requests from the plurality of participant terminals is omitted. As a result, the maintenance worker terminal 34 and the information mediation device 24 are depicted as if directly communicating with each other.

First, a maintenance worker inputs a request for acquiring the operation history data AD to the maintenance worker terminal 34. In response, in Step S11, the maintenance worker terminal 34 autonomously issues a request for lowering the transmission frequency to the information mediation device 24. In response, the program stored in the program storage unit 62 is modified so as to reduce the transmission frequency. Next, in Step S12, the maintenance worker terminal 34 requests the information mediation device 24 to transmit the operation history data AD. In Step S13, the information mediation device 24 transmits the operation history data AD to the maintenance worker terminal 34. In Step S14, the maintenance worker terminal 34 autonomously issues a request of the information mediation device 24 to restore the transmission frequency to the original value. In response, the program stored in the program storage unit 62 is modified so as to set the transmission frequency to the original value. Finally, in Step S15, the information mediation device 24 reports the end of the process of transmitting the series of operation history data AD, to the maintenance worker terminal 34.

(4-3) Change of Transmission Items

A participant terminal can request a change to the items included in the air conditioner information transmitted by the information mediation device 24.

Figure 11:
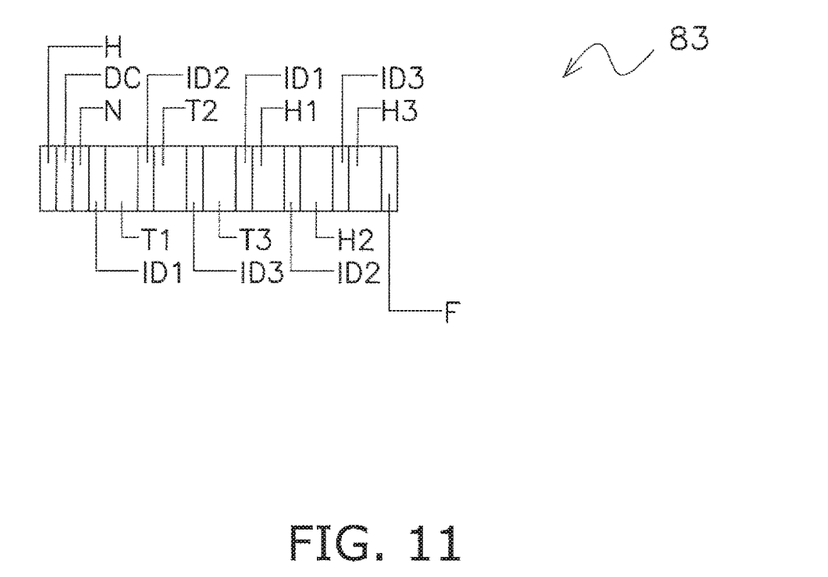
FIG. 11 is another example of data sent to the maintenance worker terminal 34.

For example, when the information mediation device 24 transmits the data 81 in FIG. 8 to the maintenance worker terminal 34, the maintenance worker inputs to the maintenance worker terminal 34 a request to transmit the current humidity detected by the plurality of indoor units 21 in addition to the current room temperature detected by the plurality of indoor units 21, in response, the information management apparatus 30 modifies the program stored in the program storage unit 62 so that the information mediation device 24 transmits the data 83 in FIG. 11. The data 83 includes the humidity H1 detected by the first indoor unit 21, the humidity H2 detected by the second indoor unit 21, and the humidity H3 detected by the third indoor unit 21. That is, the air conditioner information included in the data 83 consists of the two items of the current room temperature data and the humidity data of the indoor unit 21.

In this way, the participant terminals can issue a request to add, delete or change items included in the air conditioner information to be transmitted by the information mediation device 24.

(4-4) Communication Between Information Management Apparatus 30 and Participant Terminal As described above, in the explanations of "(4-2) Change of transmission frequency" and "(4-3) Change of transmission items", the state of intervention of the information management apparatus 30 mediating requests from a plurality of participant terminals was omitted. In this section, an example of the intervention of the information management apparatus 30, which was omitted from those descriptions, will be described.

The communication frequency at which each participant terminal communicates with the information management apparatus 30 can be set so as to be different from the transmission frequency of the information mediation device 24 transmitting air conditioner information to the information management apparatus 30, for example, once a minute. Furthermore, different values can also be set as the communication frequencies for different participant terminals. For example, the user terminal 26 is set to communicate with the information management apparatus 30 at a relatively high communication frequency of once every five minutes. This is because the owner of the building 2 using the user terminal 26 needs to quickly ascertain the states of the air conditioners 20A, 20B. During this five-minute cycle, the information management apparatus 30 receives the air conditioner information five times from the information mediation device 24 of the air conditioners 20A, 20B. The information management apparatus 30 ignores the air conditioner information four times, transmitting the information to the user terminal 26 only once. Alternatively, the information management apparatus 30 may perform statistical processing such as calculating the average value of the five information pieces regarding the air conditioner, and transmit the calculation result to the user terminal 26.

On the other hand, the manufacturer terminal 32 is set to communicate with the information management apparatus 30 at a communication frequency as low as, for example, once per hour. This is because, when the manufacturer of the air conditioners 20A, 20B using the manufacturer terminal 32 collects data of the air conditioners 20A, 20B for verification of design and the like, the rapidity as required by the owner of the building 2 is not required. Therefore, the information management apparatus 30 processes data collected over a long period of time, for example, one hour, as statistical data when necessary, and then transmits the data to the manufacturer terminal 32.

Of course, different communication frequencies may be set for a plurality of participant terminals of the same type. For example, the communication frequency of once a minute may be set for the maintenance worker terminal 34a shown in FIG. 1 while the communication frequency of once every two minutes may be set for the maintenance worker terminal 34b.

The setting of the communication frequency between each participant terminal and the information management apparatus 30 is held for example in the information management apparatus 30. When a participant terminal is powered on and the participant terminal logs into the system, the information management apparatus 30 transmits the setting of the communication frequency to the participant terminal. Thereby, the information management apparatus 30 and the participant terminal share the setting of the communication frequency. Here, when the participant terminal seeks a change regarding the communication frequency received from the information management apparatus 30, the participant terminal may be configured to transmit a message requesting the information management apparatus 30 to change the communication frequency, and the desired communication frequency. Such a configuration can provide a more user-friendly interface to participants interacting, with participant terminals. Further, in response to the request to change the communication frequency from a participant terminal, the information management apparatus 30 may be configured to take into consideration the states of other participant terminals and other circumstances, and then transmit the approval or refusal to the participant terminal that requested the change in the communication frequency. With such a configuration, the possibility that system resources of the remote management system 10 is exhausted can be reduced in advance.

Figure 12:
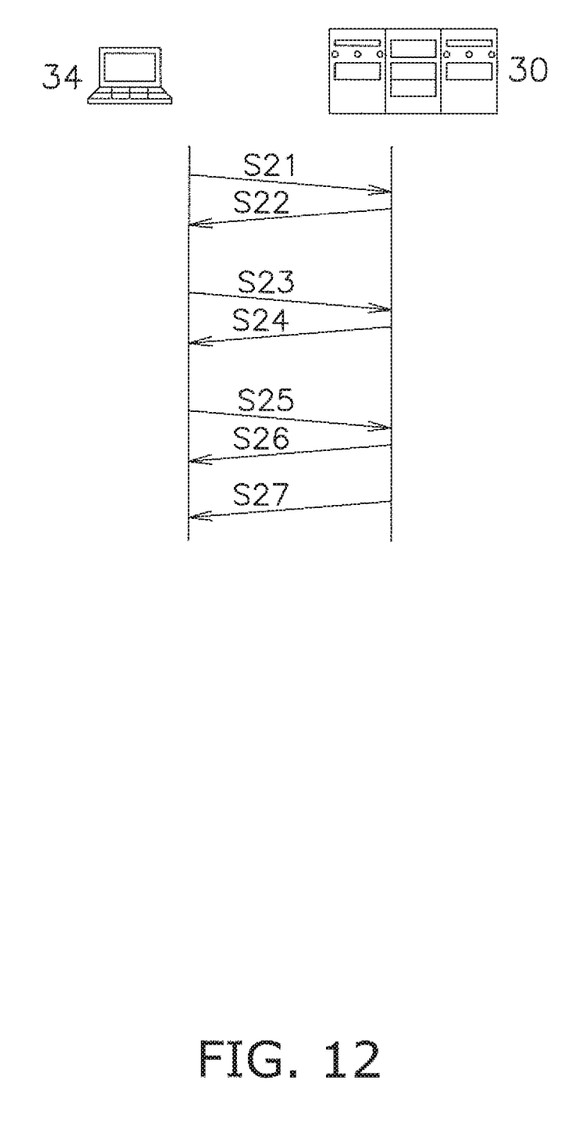
FIG. 12 is a drawing that shows the communication protocol between the maintenance worker terminal 34 and an information management apparatus 30.

In each cycle determined by the setting of the communication frequency, for example, the participant terminal side starts the communication. FIG. 12 shows an example of a communication protocol performed in each cycle between the maintenance worker terminal 34, which is a participant terminal, and the information management apparatus 30. In Step S21, the maintenance worker terminal 34 issues a request for information exchange to the information management apparatus 30. In Step S22, the information management apparatus 30 gives the maintenance worker terminal 34 an approval to start information exchange. In Step S23, the maintenance worker terminal 34 requests data from the information management apparatus 30. The data is, for example, part of the air conditioner information accumulated in the information management apparatus 30. In Step S24, the information management apparatus 30 transmits data to the maintenance worker terminal 34. In Step S25, the maintenance worker terminal 34 transmits a command to the information management apparatus 30. The command is for instructing an operation to be executed by the air conditioners 20A, 20B. In Step S26, the information management apparatus 30 reports to the maintenance worker terminal 34 the completion of the operation instructed by the command. In Step S27, the information management apparatus 30 notifies the maintenance worker terminal 34 of the end of the information exchange of this cycle. Thereby, communication in this cycle ends.

The setting of the content of the data transmitted by the information management apparatus 30 to a participant terminal may also be shared between the information management apparatus 30 and the participant terminal by the same procedure as the setting of the communication frequency. Changing the setting of the communication frequency and changing the setting of the transmission data content may be carried out not only at the time of login of the participant terminal but also at the time of the relevant cycle, in response to a request from at least one of the information management apparatus 30 and the participant terminal.

(4-5) Program Modification

In response to a request from any of the plurality of participant terminals, typically from the manager terminal 31, the information management apparatus 30 can modify the entire program stored in the program storage unit 62 of the information mediation device 24. By the information management apparatus 30 transmitting the improved program to the information intermediation device 24, the program in the program storage unit 62 can be updated. Alternatively, by rewriting the content of the program to something totally different in response to a request from any of the plurality of participant terminals, the function of the information mediation device 24 can be made into something completely different.

(5) Features (5-1)

In the remote management system 1, the frequency or content of communication of the information mediation device 24 can be changed according to a request of at least one of each participant (that is, a manager, a manufacturer, a seller, a maintenance worker, a user). Accordingly, excessive waste of system resources for the preparation of data of items to be communicated and for communication of the data is reduced.

(5-2)

The information management apparatus 30 can change the function of the in mediation device 24 in response to the content of a signal from the participant terminals (that is, the user terminal 26, the information management apparatus 30, the manager terminal 31, the manufacturer terminal 32, the seller terminal 33, and the maintenance worker terminal 34). Accordingly, the function of the information mediation device 24 can be changed according to a request of each participant. As a result, system resources can be optimized corresponding to the needs of participants.

(5-3)

The program of the information mediation device 24 can be modified in accordance with the request of each participant. Accordingly, system resources can be further optimized beyond the level of simple parameter changes.

(5-4)

An air conditioner management device or means is constructed (formed) in each of the participant terminals. Accordingly, each of the participant terminals can manage the air conditioners 20A, 20B via the air conditioner management device(s) or means 71 to 74.

(5-5)

The information management apparatus 30 can operate the air conditioners 20A, 20B, Therefore, the air conditioners 20A, 20B are remotely operated.

(5-6)

Maintenance information is displayed in the maintenance worker terminal 34. Therefore, the maintenance worker can acquire information necessary for maintenance work, for example, in the event of failure of the air conditioners 20A, 20B.

(5-7)

Each participant can manage the air conditioners 20A, 20B according to the authority of that participant. Therefore, each participant can operate the air conditioners 20A, 20B so as to meet a request within the range of permitted authority of that participant.

(5-8)

Each participant terminal periodically receives air conditioner information. Accordingly, each participant can receive new air conditioner information at appropriate time intervals.

(6) Modifications

The specific configuration of the air conditioning apparatus according to the present invention is not limited to the above embodiment, and can be appropriately changed without departing from the gist of the invention. For example, the number of air conditioners installed in the building 2 is not limited to two, and may be one or three or more. The number of the outdoor units 22 belonging to one air conditioner is not limited to one; alternatively, a plurality of outdoor units 22 may belong to one air conditioner. The outdoor unit 22 may have a wired connection to the network 50 instead of a wireless connection. The wireless communication device 23 or the information mediation device 24 may be connected to the outdoor unit 22 instead of being built in the outdoor unit 22. The operation completion report transmitted by the information mediation device 24 to the information management apparatus 30 may be replaced with an operation start report.

In the above embodiment, there are five types of participant terminals involved in the management of the air conditioners 10A, 10B: the user terminal 26, the manager terminal 31, the manufacturer terminal 32, the seller terminal 33, and the maintenance worker terminal 34. In lieu of this, the participant terminals may be some of these, for example, one, two, or three terminals. Alternatively, as participant terminals, in addition to these, other terminals may exist for use by other participants, for example, administrative agencies, electric power companies, occupants of rooms in which air conditioners are installed, and renters of those rooms.

Details of various communication protocols may be different from those described in the above embodiment. For example, in the above embodiment, the communication frequency of communication between the information management apparatus 30 and participant terminals is determined under the initiative of the information management apparatus 30. Alternatively, the communication frequency may be determined manually via the participant terminal. For example, communication may be requested to the information management apparatus 30 at an arbitrary frequency. In this case, upon logging in, the participant terminal transmits a desired communication frequency to the information management apparatus 30, and the information management apparatus 30 may reply to the participant terminal with an approval or refusal with respect to that communication frequency. The same applies to the setting of the content of data to be exchanged. Details of the communication protocol between the information mediation device 24 and the information management apparatus 30 may be changed as appropriate.

What is claimed is:

1. A remote management system comprising:
   an air conditioner;
   an information mediation device that is built in or connected to the air conditioner;
   an information management apparatus that acquires air conditioner information including items relating to the air conditioner via the information mediation device and a network; and
   a plurality of participant terminals including one or more of
      a manager terminal used by a manager,
      a manufacturer terminal used by a manufacturer,
      a seller terminal used by a seller,
      a maintenance worker terminal used by a maintenance worker, and
      a user terminal used by a user,
   the information mediation device being constituted so as to continuously transmit the air conditioner information to the information management apparatus at a certain transmission frequency, the participant terminal being configured to autonomously change the transmission frequency according to a time required to transmit the air conditioner information, and
   the information mediation device being further able to change, according to a participant request input by each of the plurality of participant terminals,
      the types of items included in the air conditioner information to be transmitted, each type of item including an operating condition of the air conditioner, or
      a transmission frequency relating to the transmission, or
      both the types of items included in the air conditioner information to be transmitted and transmission frequency relating to the transmission.

2. The remote management system according to claim 1, wherein
   the information management apparatus is constituted so as to be able to change a function of the information mediation device according to a content of a signal from the participant terminal.

3. The remote management system according to claim 2, wherein
   the information mediation device has a program storage unit in which a program used to operate the information mediation device is stored, and
   the information management apparatus modifies the program in order to change the function of the information mediation device.

4. The remote management system according to claim 2, wherein
   the information management apparatus uses the participant terminals to form an air conditioner management device.

5. The remote management system according to claim 1, wherein
   the information management apparatus is able to operate the air conditioner.

6. The remote management system according to claim 2, wherein
   the participant terminals include the maintenance worker terminal, and
   the information management apparatus further displays maintenance information on the maintenance worker terminal in the event of failure of the air conditioner.

7. The remote management system according to claim 2, wherein
   each of the participant terminals is able
      to acquire the items included in the air conditioner information from the information management apparatus in accordance with an authority set to that participant terminal, and
      to perform operation of the air conditioner in accordance with the authority of the participant terminal via the information management apparatus.

8. The remote management system according to claim 1, wherein
each of the plurality of participant terminals and the information management apparatus are constituted so as to perform communication at a predetermined communication frequency, and
during the communication, the information management apparatus is constituted so as to transmit at least a part of the air conditioner information received from the information mediation device to the participant terminal.

9. The remote management system according to claim 3, wherein
the information management apparatus uses the participant terminals to form an air conditioner management device.

10. The remote management system according to claim 2, wherein
the information management apparatus is able to operate the air conditioner.

11. The remote management system according to claim 3, wherein
the information management apparatus is able to operate the air conditioner.

12. The remote management system according to claim 4, wherein
the information management apparatus is able to operate the air conditioner.

13. The remote management system according to claim 3, wherein
the participant terminals include the maintenance worker terminal, and
the information management apparatus further displays maintenance information on the maintenance worker terminal in the event of failure of the air conditioner.

14. The remote management system according to claim 4, wherein
the participant terminals include the maintenance worker terminal, and
the information management apparatus further displays maintenance information on the maintenance worker terminal in the event of failure of the air conditioner.

15. The remote management system according to claim 5, wherein
the participant terminals include the maintenance worker terminal, and
the information management apparatus further displays maintenance information on the maintenance worker terminal in the event of failure of the air conditioner.

16. The remote management system according to claim 3, wherein
each of the participant terminals is able
to acquire the items included in the air conditioner information from the information management apparatus in accordance with an authority set to that participant terminal, and
to perform operation of the air conditioner in accordance with the authority of the participant terminal via the information management apparatus.

17. The remote management system according to claim 4, wherein
each of the participant terminals is able
to acquire the items included in the air conditioner information from the information management apparatus in accordance with an authority set to that participant terminal, and
to perform operation of the air conditioner in accordance with the authority of the participant terminal via the information management apparatus.

18. The remote management system according to claim 5, wherein
each of the participant terminals is able
to acquire the items included in the air conditioner information from the information management apparatus in accordance with an authority set to that participant terminal, and
to perform operation of the air conditioner in accordance with the authority of the participant terminal via the information management apparatus.

19. The remote management system according to claim 6, wherein
each of the participant terminals is able
to acquire the items included in the air conditioner information from the information management apparatus in accordance with an authority set to that participant terminal, and
to perform operation of the air conditioner in accordance with the authority of the participant terminal via the information management apparatus.

20. The remote management system according to claim 2, wherein
each of the plurality of participant terminals and the information management apparatus are constituted so as to perform communication at a predetermined communication frequency, and
during the communication, the information management apparatus is constituted so as to transmit at least a part of the air conditioner information received from the information mediation device to the participant terminal.

* * * * *